J. H. KATE.
GAS AND SMOKE SEALING DEVICE FOR INCUBATORS.
APPLICATION FILED AUG. 30, 1916.
1,229,091.
Patented June 5, 1917.
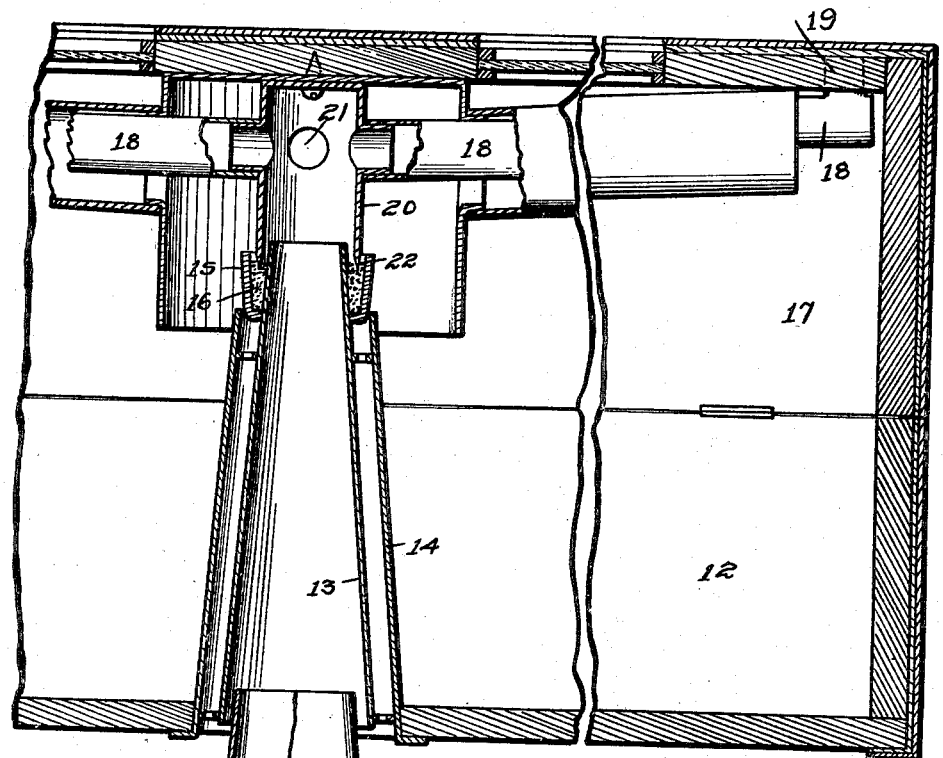
Fig. 1.
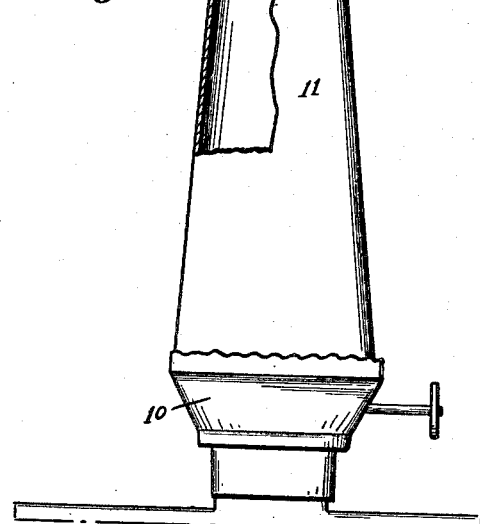
Fig. 2.
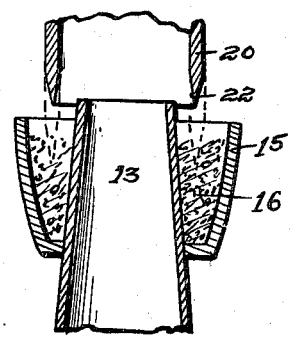
Witness
Will Freeman
Inventor
John H. Kate
by Druig + Bair Att'ys

UNITED STATES PATENT OFFICE.

JOHN H. KATE, OF DES MOINES, IOWA, ASSIGNOR, BY DIRECT AND MESNE ASSIGNMENTS, TO X RAY INCUBATOR COMPANY, OF DES MOINES, IOWA, A CORPORATION OF IOWA.

GAS AND SMOKE SEALING DEVICE FOR INCUBATORS.

1,229,091. Specification of Letters Patent. Patented June 5, 1917.

Application filed August 30, 1916. Serial No. 117,664.

*To all whom it may concern:*

Be it known that I, JOHN H. KATE, a citizen of the United States, and resident of Des Moines, in the county of Polk and State of Iowa, have invented a certain new and useful Gas and Smoke Sealing Device for Incubators, of which the following is a specification.

The object of my invention is to provide a device of simple, durable and inexpensive construction, designed to be applied between the heat conducting flue attached to the lower or stationary member of an incubator body, and the hot air radiating devices applied to the upper or hinged member of a hot air incubator, for the purpose of permitting the upper member to be freely moved or separated from the lower member when the incubator is being opened, and when the incubator is closed to form a seal to prevent the escape of gas or smoke from the heat conducting pipes of the upper and lower members into the interior of the incubator.

My invention consists in the construction and arrangement and combination of the several parts of the sealing device, and the combination thereof with the adjacent parts of an incubator of the kind mentioned, whereby the objects contemplated are attained, as hereinafter more fully set forth, pointed out in my claims, and illustrated in the accompanying drawings, in which:

Figure 1 shows a detail view partly in section, illustrating portions of a stationary or lower member of an incubator body, and also of the upper or hinged member thereof, illustrating the hot air conducting flues and showing my improved sealing device applied thereto as in use, and Fig. 2 shows an enlarged, detail, sectional view illustrating the upper flue member slightly separated from the sealing device. The dotted lines in said figure show the upper member inserted in the sealing device as when the cover of the incubator is closed.

Referring to the accompanying drawings, I have used the reference numeral 10 to indicate an ordinary lamp for supplying hot air to an incubator, which lamp is provided with a metal chimney 11 of the ordinary kind. The numeral 12 indicates the lower or stationary part of the incubator body. This is provided with a flue member 13 preferably tapered toward its upper end and open at both ends, the lower end being designed to receive the lamp chimney 11. Surrounding the flue member 13 is a metal jacket 14 open at both ends, for the purpose of admitting fresh air to the interior of the incubator and holding same in contact with the flue member 13 for heating it before it is admitted to the interior of the incubator.

The lower sealing member comprises a cup-shaped body portion 15, having a circular opening in its bottom and open at its top. It is so shaped and proportioned as to receive the top of the flue member 13 in the circular opening in its bottom so that the cup is thereby supported on the upper end of the flue member in the position shown in the drawings. In use the space between the inside of the cup and the upper end of the flue is preferably filled with fine sand or fine salt 16.

The upper or hinged member of the incubator body is indicated by the numeral 17 and is provided in the ordinary manner with heat circulating or radiating pipes 18, each of which has an outlet at its outer end extending up through the top of the incubator body, as indicated by dotted lines at 19. The inner ends of these flue or radiating members enter a distributing flue 20 closed at its upper end and open at its lower end and provided with openings 21 to communicate with the various flues 18. The lower end of the distributing flue 20 is open and the edge thereof is preferably sharpened or pointed at 22 and is of a diameter designed to receive the upper end of the flue member 13 and enter the sealing cup 15 at a point midway between the flue member and the interior of the sealing cup 15. By having this lower end of the distributing flue 20 sharpened, it is obvious that it will enter to a considerable distance in the fine sand or salt within the sealing cup, and when the hinged member of the incubator is closed, as shown in Fig. 1, a gas and smoke tight joint is provided between the flue members 13 and 20 so that no gas or smoke will enter the interior of the incubator.

I have found that by forming these sealing cups of a rigid material such, for instance, as cast iron, they may be forced down on the tapered sheet metal flue member 13 firmly enough to provide a joint that will retain the fine sand or salt employed in the sealing member without the necessity of soldering or tightly fitting the cup to the said flue member.

There has been considerable difficulty in the manufacture of incubators of this class in making the parts connecting the flue members of the upper and lower body portions so accurate as to provide a gas and smoke tight joint, and furthermore, even if a joint is made gas and smoke tight when originally constructed, the expansion and contraction of the wood or other material forming the incubator body frequently changes the adjustment of the parts, and difficulty in maintaining gas and smoke tight joints is experienced. By means of my improvement it is not necessary that great accuracy in the joint be attained, for the reason that while there may be considerable space between the lower end of the flue member 20 and the upper end of the flue member 13, nevertheless a gas and smoke tight joint is always provided even if the relative adjustment of these parts is changed, due to contraction or other causes.

I claim as my invention:

1. In an incubator having a stationary lower body portion and a hinged upper body portion, the combination of a hot air flue member in the lower body portion, a sealing cup surrounding the upper end thereof and designed to contain a material such as fine sand, and a flue member in the upper incubator member, having an open lower end designed when the hinged member is closed to enter the interior of the sealing cup between the lower flue member and the sides of the cup.

2. In an incubator having a stationary lower body portion and a hinged upper body portion, the combination of a tapered sheet metal hot air flue in the lower body portion, a sealing cup having an opening in its bottom to receive the tapered upper end of said flue member and to form a relatively tight joint therewith, and designed to contain and hold material such as fine sand, and a flue member carried by the hinged incubator body portion having an open lower end, the edge thereof being sharpened and being of such size and so positioned that when the incubator hinged member is closed, it will enter the material in the cup between the top of the flue in the lower incubator body portion and the sides of the sealing cup, for the purposes stated.

3. In a device of the class described, an incubator body divided along a central longitudinal line and having means for hinging the upper portion to the lower portion at one of the side edges, a hot air flue member tapered from its lower portion toward its upper portion and adapted to extend from the bottom of the lower portion of the body to a point substantially in line with the top thereof, a sealing cup having an opening in its bottom adapted to receive the upper end of said flue and also adapted to have its upper edge disposed in substantial alinement with the upper end of the flue, said cup having its sides tapered outwardly from the bottom toward the top, a flue member disposed in the upper body portion and having its lower end adapted to enter the space between the sealing cup and the first described flue when the upper body portion is in its closed position, and a granular sealing substance within said sealing cup adapted to receive the lower end of the flue in the upper body portion when said body portion is in its closed position.

4. In a device of the class described, an incubator body divided along a central longitudinal line of its sides into an upper and lower body portion, means for hinging the two body portions together on one side, a central heating flue extending from the bottom to the top of the lower body portion, said heating flue being tapered so that the upper end is of less diameter than the lower end, a sealing cup tapered in the opposite direction from said flue and adapted to receive said flue through its bottom, the upper edges of said cup being substantially alined with the upper edges of said flue, a granular sealing substance disposed within said cup, and a central heating flue disposed within the upper body portion having its lower edge sharpened whereby the surface of said flue is beveled away from said edge in both directions, the parts being so arranged that when the upper body portion is in its closed position, the sharpened edge of the last described heating flue will enter the sealing substance in the cup and the beveled surfaces adjacent to said edge will coact with the inclined surfaces of the cup and first described flue to compress the sealing substance therebetween.

Des Moines, Iowa, August 17, 1916.

JOHN H. KATE.

Copies of this patent may be obtained for five cents each, by addressing the "Commissioner of Patents, Washington, D. C."